July 7, 1959     K. J. KNUDSEN     2,894,179

INSTRUMENT RELAY

Filed Sept. 14, 1955

INVENTOR.
Knud J. Knudsen
BY
Johnson and Kline
ATTORNEYS

United States Patent Office 2,894,179
Patented July 7, 1959

2,894,179
INSTRUMENT RELAY

Knud J. Knudsen, Woodbury, Conn., assignor to The Lewis Engineering Company, Naugatuck, Conn., a corporation of Connecticut Application September 14, 1955, Serial No. 534,347

1 Claim. (Cl. 317—146)

This invention relates to sensitive instrument relay means and more particularly to relay means operated by a movable part of an instrument at predetermined positions thereof.

The relay device of the present invention may be advantageously used in connection with signaling means, both visible and audible, which are intended to function in response to predetermined levels of temperature of mechanisms, for example an aircraft jet engine, for giving first a warning signal and then a final signal. The signaling means serve to direct the attention of the unnoticing observer to the temperature of the mechanism, particularly when it approaches critical limits.

An object of this invention is to provide a relay which is capable of being operated by a sensitive instrument and which when operated by a movable part of the instrument, will not block or affect the functioning of the instrument over its entire range.

Another object of this invention is to provide a sensitive instrument with a plurality of relays, one of which is operated by the instrument movement at a point intermediate its limits of movement and another relay operated by the instrument movement at one of the limits of its travel.

Another object of my invention is to provide a sensitive instrument, such as a pyrometer, with a plurality of relays which are controlled by the instrument and which relays are light in weight, consume very little power, are substantially unaffected by vibration such as may be encountered in an aircraft, have an extremely long life, and yet are of such simple construction that they substantially decrease the probability of malfunctioning.

A further object of my invention is to provide in a sensitive instrument of the above type, a relay which is energized when the movable part of the instrument reaches a predetermined position and which energization will be maintained for a further extended movement of the part.

In prior devices in which a sensitive instrument has been used to actuate external electrical devices by means of relays, a movable part, or pointer in the case of a meter, was used as a contact of an electrical switch, the other part of the switch being a fixed contact. The power in a sensitive instrument, such as a pyrometer, disclosed herein, available to move the pointer is minute, on the order of only .02 of a micro-watt. With such a minute moving force, the physical engagement of the movable part of the meter with the fixed contact blocks any further movement of the movable part. Thus, whenever, it was desired to have the meter function over its entire range and energize a relay intermediate the range and at the end of the range, an additional meter had to be employed, since if the same meter was used to actuate the relays, the meter could not function over its full range, from zero to maximum.

In overcoming the above disadvantages, I provide a relay energizing means operated by a moving part of the meter, which does not require physical engagement between the part and another fixed member. This enables my device to be utilized on a meter to actuate a relay intermediate the path of movement of the part and still permit the meter to indicate over its entire scale.

A feature of my invention is the provision, in a meter of the above type, of two coils placed in inductive relation which are settable at a predetermined point in the path of the movable part for causing actuation of a relay. The relay in turn may be advantageously employed to control a signaling means, though other types of electrical devices may be controlled. By virtue of the provision of an aluminum vane, rotated by the instrument movement and movable between the two coils, inductance therebetween is stopped, which permits actuation of a warning relay. The coils form part of an oscillating circuit. The length of movement of the meter during which the signal is maintained is correlated to the length of the vane.

Other features and advantages will hereinafter appear.

Figure 1:
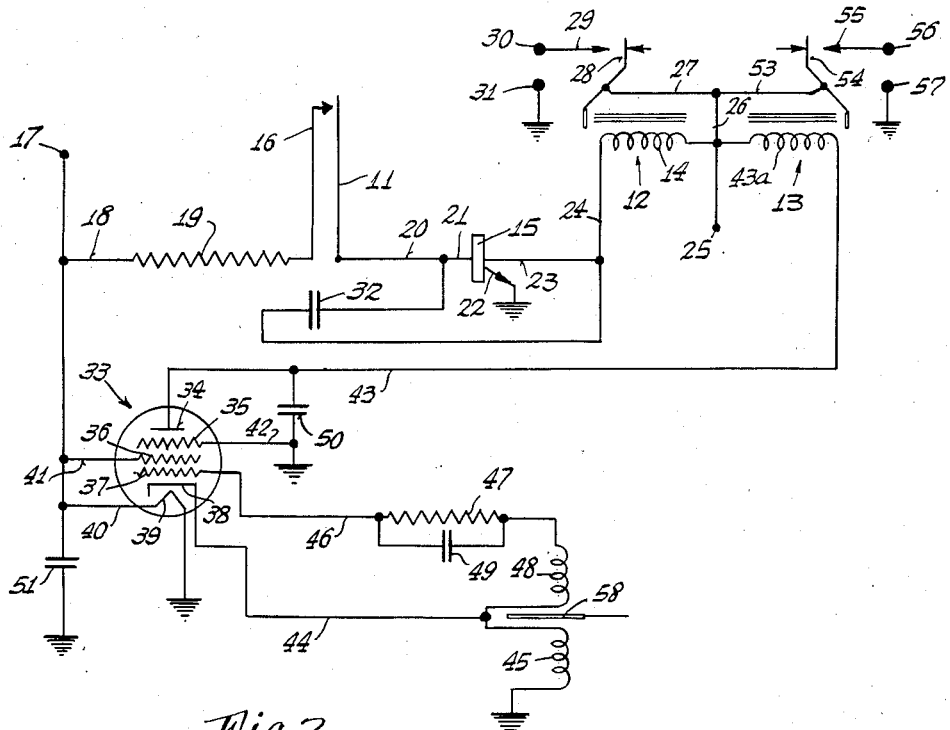
Figure 1 is an electric schematic diagram of my invention.

Referring to Figure 1, there is shown a schematic diagram of the components and connections which comprise my invention. A meter 10, which may be a pyrometer, has a pointer or indicator 11 which responds to the potential produced by a thermocouple (not shown). The thermocouple is positioned adjacent an engine or other mechanism whose heat is to be indicated by the instrument. The pointer 11 will traverse an arcuate path in response to variations in the temperature of the thermocouple, which creates a varying E.M.F. in proportion to the temperature. The meter reads in degrees and its movement is correlated to the magnitude of the potential.

There is provided a plurality of relays which are controlled by the position of the instrument movement. While any portion of the instrument movement may be used to actuate the relays, in the specific embodiment shown herein, the indicator or pointer 11 of the instrument is employed for one relay, while an additional element movable with the indicator, as set forth hereinafter, is used for another relay. Though the relays may control any type of external electrical mechanism, I may advantageously employ them to actuate signaling means, such as a bell and/or an electric bulb.

A normally open relay is generally indicated by the reference numeral 12 and is hereinafter referred to as the final relay since it may be employed to give a final signal. Another normally open relay is generally indicated by the reference numeral 13 and hereinafter is termed the warning relay since it may be employed to give a warning signal. The circuit for the final relay 12 includes a transistor 15 and a settable contact 16. I prefer to employ a silicon, NPN type transistor. The settable contact 16 is mounted on the instrument for adjustable location in the path of the pointer 11.

The positive side of a D.C. supply is connected to the pin 17 and, when the device is used in an airplane, it may be 20 to 30 volts. A line 18 connects the settable contact 16 through a resistor 19 (which may be 800,000 ohms) through the pointer 11 and a line 20 to the base 21 of the transistor 15. The emitter 22 of the transistor is connected to the ground or negative side of the D.C. supply. A collector 23 of the transistor 15 through a line 24 and an energizing coil 14 of the relay 12 is connected to the pin 25, which is also connectible to the positive side of the D.C. supply. For conducting current from the D.C. supply to the final relay, I provide a line 26, a line 27 and a normally open switch 28 of the relay 12, a contact 29, and an external pin 30. A pin 31 is connected to the ground or negative side of the D.C. supply. The final signal device or other external electrical mechanism to be controlled is connected to the pins 30 and 31.

A condenser 32 (which may have a value of .25 mfd.) is connected between the base 21 of the transistor 15 and the coil 14 in order to prevent chattering of the relay contacts 28, 29 upon a flickering or rapid make-and-break engagement of the pointer 11 and settable contact 16. The flickering may be caused by the vibrations normally encountered in an airplane. The condenser 32 permits part of the current in the energizing coil 14 of the relay 12 to be discharged at a predetermined rate through the base 21 of the transistor 15 as the coil field collapses, and tends to maintain the relay 12 energized.

For operating the warning relay 13, a circuit including a pentode 33 (such as a 26A6 tube) is provided. The tube 33 has a plate 34, a suppressor grid 35, a screen grid 36, a control grid 37, a cathode 38 and a heater 39. A line 40 connects the heater 39 to the pin 17 for energizing the heater. A line 41 connects the screen grid 36 to the positive side of the D.C. supply. A line 42 connects the suppressor grid 35 to the ground, or negative side of the D.C. supply. The plate 34 through a line 43 is placed in series with the energizing coil 43a of the warning relay 13, which in turn is connected to the pin 25 or the plus side D.C. supply line. The cathode 38 through a line 44 is connected to a coil 45, which coil has its other end connected to the ground. A line 46 connects the control grid 37 through a grid-leak resistor 47 (which may be on the order of 2 megohms), through another coil 48 to the coil 45. The coils 45 and 48 are in effect a single coil having a tap. A grid-leak condenser 49 (which may have a value of .002 mfd.) is provided to shunt the resistor 47.

Filter condensers 50 and 51 (which may be on the order of .002 mfd.) are positioned between the line 43 and the ground, and the pin 17 and the ground respectively, to permit passage of an R.F. current component. The pin 25, which is connected to the D.C. supply, is joined through a line 53, a normally open switch 54 of the warning relay 13 and a contact 55 to a pin 56. A pin 57 is connected to the ground or negative side of the D.C. supply and the external means, which may be a warning signaling means or other electrical apparatus, is connected to the pins 56 and 57.

A flat plate aluminum vane 58 having an arcuate configuration is attached to the instrument for movement therewith. At a predetermined position of the instrument movement as shown by the pointer 11, the edge of the vane will be disposed between the coils 45 and 48. The arcuate configuration of the vane enables it to have a portion between the coils for a large movement of the instrument.

The operation of the device is as follows:

At normal operating temperatures of the aircraft engine, the tube 33 is self-oscillating and effectively prevents flow of the plate current to energize the warning relay coil 43a. Potential changes in coil 45 induce potential changes in coil 48, which are impressed on the control grid 37. The tube is thus self-oscillating at a very high frequency (in the neighborhood of 50 megacycles) with a total current in the oscillating coils of less than 0.2 milliamps. It will be noted that both the plate and screen grid, in addition to the suppressor grid, are effectively grounded in respect to the oscillating frequency. The amount of plate current when the tube is oscillating is very small and insufficient to energize the relay. This is caused by the increased grid bias impressed on the grid by the oscillatory circuit through the grid leak condenser 49.

When the thin aluminum vane 58 is inserted between the cathode coil 45 and the grid coil 48, it effectively blocks induction therebetween and stops the tube oscillation, thus permitting the normal amount of plate current to flow since the control grid then has a zero bias. The flow of plate current will energize the relay 13, closing the switch 54 and operating the warning relay 13. It will be appreciated that whenever the vane is positioned between the two coils, the warning relay will be actuated. Upon a still further movement of the instrument movement and the pointer 11, the pointer will become in electrical engagement with the settable contact 16 and operate the final relay. Current will thus flow from the pin 17, through line 18, resistor 19, contact 16, pointer 11 and line 20 to the base 21 of the transistor 15. The transistor will become excited, lowering the resistance between the collector and the emitter, which then permits a large amount of current to flow from the pin 25 through energizing coil 14, line 24, collector 23 and emitter 22. The switch 28 will accordingly engage the contact 29 so that the pin 30 is connected to the pin 25 through the lines 26, 27, switch 28 and the contact 29. The final relay is thus excited. While, in the preferred embodiment, normally open relays are shown, it will be apparent that normally closed relays may be employed if it were desired to open an external circuit at predetermined temperature levels, rather than close a circuit, as shown.

Figure 2:
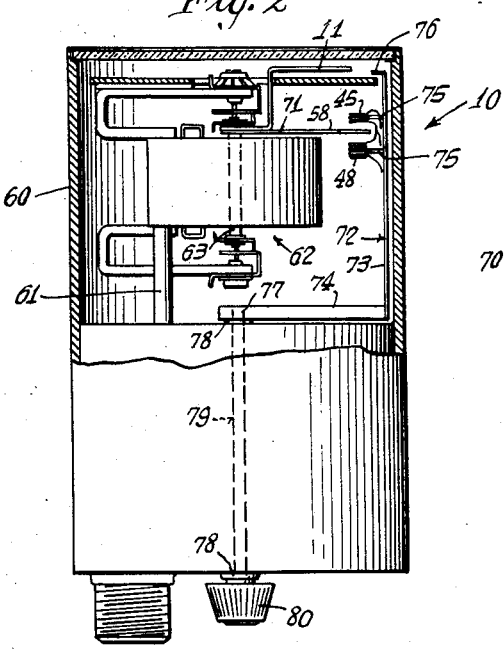
Figure 2 is an elevation partly in section of the instrument.
Figure 3:
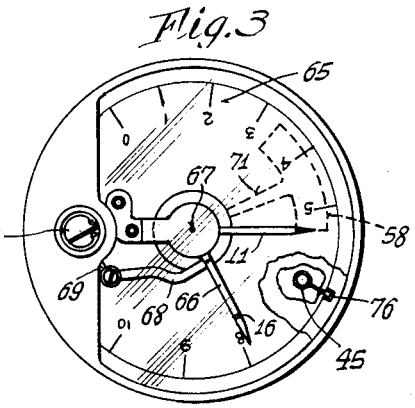
Figure 3 is a plan partly in section of the instrument.

Shown in Figs. 2 and 3 are the elements of my instrument relays as they may be positioned in an instrument casing. The casing 60 has an upright 61 for supporting an instrument movement generally indicated by the reference number 62. The movement has a shaft 63 which is rotated by the movement. Attached to the shaft is the pointer or indicator 11 for movement about a scale 65. The settable contact 16 is mounted on the instrument to be in the path of movement of the pointer 11 for engagement therewith. Contact 16 is carried by an arm 66 pivoted as at 67, links 68 and 69 are connected to the arm 66 and to a rotatable member 70 which is on the exterior of the instrument. Rotation of the member 70 causes the arm 66 carrying contact 16 to move about its pivot 67 and the scale. The aluminum vane 58 is attached to an arm 71 which is secured to the shaft 63 beneath the scale 65. An L-shaped bracket 72 has one leg 73 extending, as shown in Fig. 2, vertically, and another leg 74, extending horizontally. The leg 73 has two support members 75 to which are attached the coils 45 and 48. The end of the leg 73 is bent over about the edge of the scale as at 76 to permit observation of the location of the coils. The leg 74 is connected to a shaft 79 as at 77. The shaft 79 is rotatably mounted in bearings 78 and has an end projecting through the instrument casing 60 to which is attached a knob 80. Rotation of the knob 80 will cause the coils 45 and 48 to be rotatable about the path of the vane 58 while the bent-over portion 76 enables a user to determine the location of the coils from the front of the instrument. Frictional forces maintain the coils, bracket 72 and shaft 79 in position after having been located.

Variations and modifications may be made within the scope of the claim and portions of the improvements may be used without others.

I claim:

An instrument for giving an indication for a range of movement of the instrument and for giving a second indication at an end of the range of movement comprising a first means connectible to an external electrical indicating mechanism, and including a switch actuated by a solenoid for controlling energization of the indicating mechanism, and circuit means for controlling energization of the solenoid comprising a thermionic tube having a control grid, a cathode and a plate, means connecting the cathode and plate to a source of direct current to provide a potential difference therebetween with said solenoid being in series with the plate, an oscillatory circuit connected to the control grid and cathode including a pair of spaced inductance coils for reducing normal current flow in the tube between the cathode and plate and a vane operated by the instrument for passing between the coils to limit inductance therebetween and provide for normal current flow through the tube to energize the solenoid; and a second means connectible to an external electrical indicating device, and including a second switch actuated by a second solenoid for controlling energization of the indicating device, and a circuit for controlling energization of the second solenoid including an indicator actuated by the instrument and an electrical contact positioned in the path of movement of the indicator and constituting with the indicator a switching means, a transistor having an emitter, collector and a base with the base connected to the contact, leads interconnecting the emitter and collector in series with the second solenoid and the source of direct current for energizing the solenoid and an input lead connected to the contact and the source of direct current whereby upon engagement between the indicator and the contact current flows in the base-emitter of the transistor causing the resistance of the collector-emitter path of the transistor to be lowered to permit sufficient current to flow between the emitter and collector to cause energization of the second solenoid.

References Cited in the file of this patent

UNITED STATES PATENTS

| | | |
|---|---|---|
| 2,505,577 | Rich | Apr. 25, 1950 |
| 2,590,826 | Schenck | Mar. 25, 1952 |
| 2,642,530 | Mouzon | June 16, 1953 |
| 2,704,339 | Wescott | Mar. 15, 1955 |
| 2,716,206 | Salati | Aug. 23, 1955 |
| 2,743,397 | Derr | Apr. 24, 1956 |
| 2,752,498 | Ehret | June 26, 1956 |
| 2,798,157 | Grubea | July 2, 1957 |

FOREIGN PATENTS

| | | |
|---|---|---|
| 628,643 | Great Britain | Sept. 1, 1949 |